United States Patent [19]

Jeans

[11] Patent Number: 4,564,483

[45] Date of Patent: Jan. 14, 1986

[54] METHOD AND APPARATUS FOR BATCH CARBONATING

[75] Inventor: Edward L. Jeans, Lydart, Wales

[73] Assignee: Cadbury Schweppes, PLC, London, United Kingdom

[21] Appl. No.: 550,455

[22] Filed: Nov. 10, 1983

[51] Int. Cl.⁴ .............................................. B01F 3/04
[52] U.S. Cl. ................... 261/64 B; 99/323.1; 137/538; 137/859; 251/325; 251/337; 261/65; 261/122; 261/DIG. 7
[58] Field of Search ............ 261/52, 64 R, 65, 121 R, 261/50 B, 35, 1, DIG. 7, 64 B, 122; 99/323.1; 222/129.1, 145; 426/474, 477; 137/538, 859; 251/337, 325, 354

[56] References Cited

U.S. PATENT DOCUMENTS

| | | |
|---|---|---|
| 1,500,283 | 7/1924 | Stinson ........................ 261/DIG. 7 |
| 2,117,271 | 5/1938 | Bowman ...................... 261/DIG. 7 |
| 3,572,550 | 3/1971 | Colomina et al. ............ 261/DIG. 7 |
| 3,752,452 | 8/1973 | Iannelli ........................ 261/DIG. 7 |
| 3,780,198 | 12/1973 | Pahl et al. .................... 261/DIG. 7 |
| 4,187,262 | 2/1980 | Fessler et al. .................... 261/50 B |
| 4,298,551 | 11/1981 | Adolfsson et al. ........... 261/DIG. 7 |
| 4,300,923 | 11/1981 | Skoli et al. ................... 261/DIG. 7 |
| 4,304,736 | 12/1981 | McMillin et al. .................... 261/35 |
| 4,316,409 | 2/1982 | Adams et al. ................ 261/DIG. 7 |
| 4,323,090 | 4/1982 | Magi ............................ 261/DIG. 7 |
| 4,481,986 | 11/1984 | Meyers ........................ 261/DIG. 7 |
| 4,482,509 | 11/1984 | Iannelli ........................ 222/129.1 X |

Primary Examiner—Richard L. Chiesa
Attorney, Agent, or Firm—Kenyon & Kenyon

[57] ABSTRACT

Water is carbonated in a fast and efficient manner by causing a flow of carbon dioxide through the water being carbonated at a controlled rate through a small orifice until a predetermined pressure is reached in the carbonator and, upon reaching the predetermined pressure terminating flow through the orifice.

10 Claims, 3 Drawing Figures

METHOD AND APPARATUS FOR BATCH CARBONATING

BACKGROUND OF THE INVENTION

This invention relates to carbonators for carbonating water for beverages in general and, more particularly, to a bleed valve for use in a carbonator.

In the carbonator disclosed in my copending application Ser. No. 140,685 now abandoned, carbon dioxide is admitted into a diluent tank to carry out batch carbonation through an orifice in conventional fashion. The orifice slows down the gas but must be large enough to permit dispensing carbonated water at the desired rate. Full carbonation takes from 12 to 15 minutes. Prior to that time the carbonation is poor. Thus, the need for a method and means of achieving batch carbonation quickly is apparent.

SUMMARY OF THE INVENTION

It has been discovered that it is possible to obtain faster carbonation in a batch carbonator such as the type disclosed in my co-pending U.S. patent application Ser. No. 140,685 now abandoned by allowing some of the carbon dioxide to slowly bleed out of the carbonator as pressure builds up therein.

The present invention is based on the recognition that the desired effect is achieved because of passage of the carbon dioxide into and through the water in the carbonator in a controlled and extended manner. By increasing the length of time during which the gas is introduced into the carbonator, the time of contact between gas and water is increased. This in turn increases the effective surface area of contact through which absorption of the gas into the water takes place. The present invention provides both an improved bleed valve, and a slow feed valve, which achieves the same effect of prolonged contact as the bleed valve but without the loss of gas associated with the bleed valve.

In general terms, in accordance with the present invention, batch carbonation is carried out by causing carbon dioxide under pressure to flow at a controlled rate through water being carbonated in a vessel, by causing flow through a small orifice until a predetermined pressure is reached and then terminating flow through the orifice.

In one embodiment this is accomplished with a bleed valve. The bleed valve of the present invention can be inserted in the top of a carbonator and includes a biased piston-like member which moves upwardly as pressure increases within the tank until it reaches a position shutting off the flow of gas at which position a visible color indication is given.

In a second embodiment a feed valve is used. The feed valve of the present invention permits feeding at a slow rate so that the gas gradually enters the carbonator achieving a better carbonation but at the same time is capable of opening to a larger orifice prior to dispensing taking place so as to provide the necessary flow to carry out dispensing, replacing a quantity of water with gas as quickly as necessary. The flow is regulated in response to this differential pressure between the source of carbon dioxide and the carbonator to maintain flow over a longer period.

DETAILED DESCRIPTION

Figure 1:
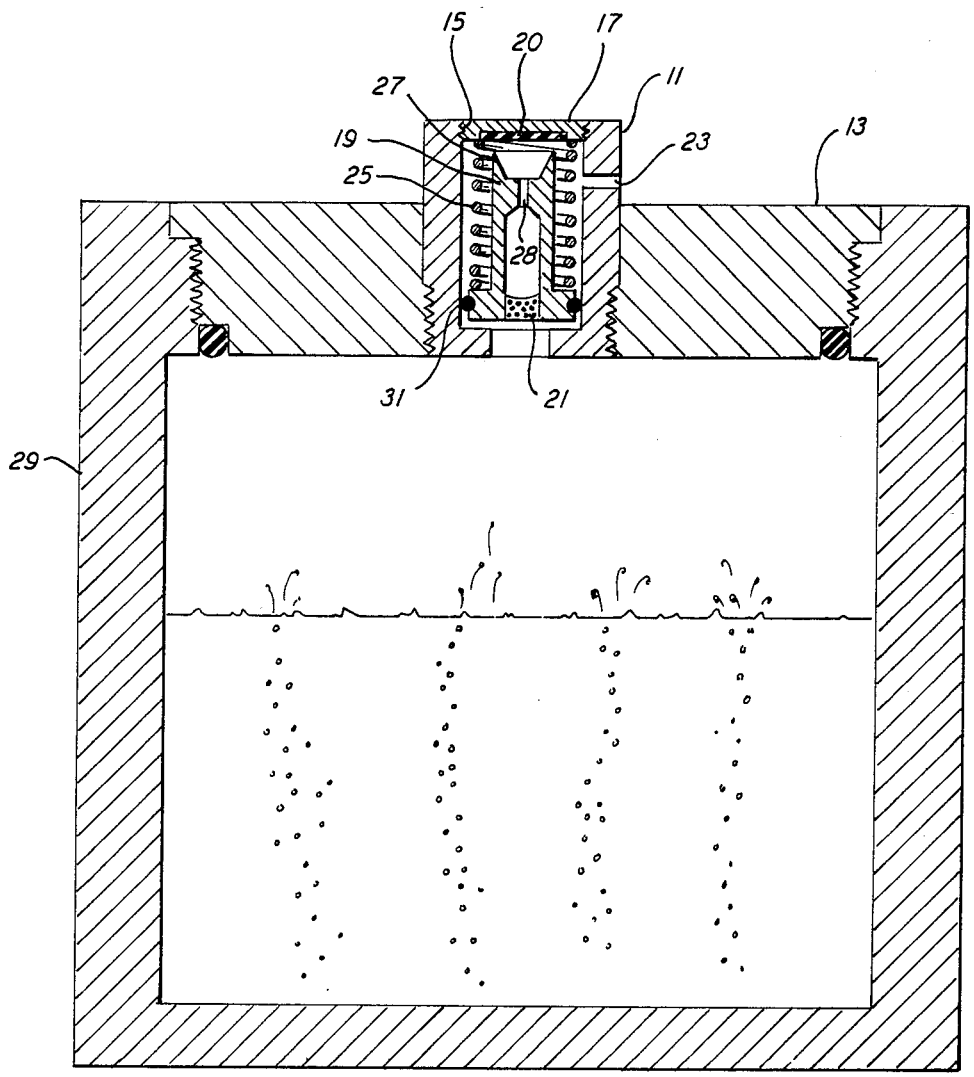
FIG. 1 is a cross-sectional view of a carbonator bleed valve according to the present invention.

As illustrated by FIG. 1, a valve which includes body 11 is screwed into an appropriate thread in the lid 13 of a carbonator. At the outer portion of the body 11 is a threaded part 15 into which an adjusting disc 17, including a rubber seal pad 20, is screwed. Extending downwardly from the adjusting disc 17 is an elongated hollow piston 19 with an O ring sealing means 31 and which has a fine screen-like structure at its inner end 21. The piston member 19 is biased inwardly by a spring 25. The outer end of the valve body 11 contains three cutouts 23 beneath the adjustable disc through which the piston can be seen. The outer end of piston 19 has a dished seat 27 with an orifice 28 therein of approximately eighteen thousandths of an inch. As carbon dioxide is admitted to the carbonator 29 to carbonate it, gas escapes through the screen portion 21 and through the orifice 28 in seat 27 and out through cutouts 23 in the body 11. Since the orifice admitting gas to the carbonator is larger than orifice 28, pressure builds up in the tank. As pressure builds up in the carbonator tank, the piston member 19 moves outwardly against the biasing spring 25 until seat 27 seals against seal pad 20 both shutting off the venting flow and, at the same time, indicating, by means of a colored portion of piston 19 visible through cutouts 23, that carbonation is complete. (This indication is not absolutely essential.)

The adjusting disc 17 is generally adjusted to give a carbonation of 3.8 volumes in two minutes. Typically the opening or orifice 28 will have a diameter of 0.018 inches. The carbonator inlet is typically sized at 0.025 in. diameter. At 45 psi this permits drawing 5 ounces of water in six seconds and replacement with gas. With the 0.25 inch inlet and a 0.018 inch outlet, the necessary pressure buildup to cause the automatic seating takes place in about two minutes.

Figure 2:
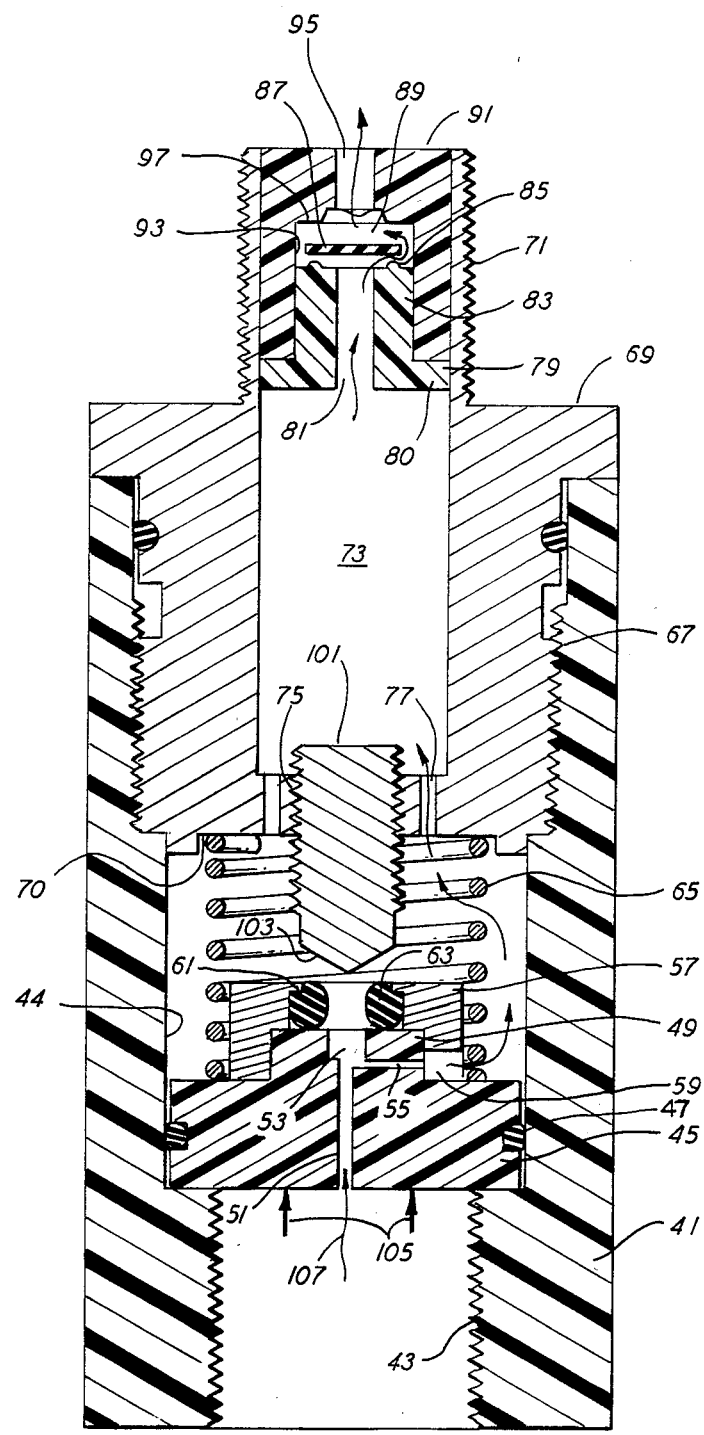
FIG. 2 is a cross-sectional view of a slow feed valve according to the present invention.

FIG. 2 is a cross-sectional view of an automatic gas feed valve for accomplishing the same purpose. The valve includes a body part 41 containing a threaded bore 43 of a first diameter for sealingly attaching a coupling connected to a source of carbon dioxide at a pressure of 45 psi, for example. Inward from this bore is a larger bore in which is piston-like member 45 with an O-ring sealing means 47 at its circumference is inserted. Piston member 45 has at its inner end a cylindrical projecting portion 49. From its outer end or inlet end, is a bore 51 of minimum diameter of 0.035 inches opening up into a larger bore 53 in the projecting portion 49. There is also a side port 55 in the projecting portion having a diameter of approximately 0.013 inches.

Inserted over the projecting part 49 and sealing to it is a sleeve 57 having an opening 59 aligned with the port 55. The sleeve contains a central opening 61 designed to retain an O-ring 63. A biasing spring 65 surrounds the sleeve 57. Adjacent the bore 44 is a threaded bore 67. Inserted into the threaded bore 67 is a plug 69 having a recess 70 at its inner end into which spring 65 fits. This member biases the spring against the piston 45 tending to bias the piston in an inward direction. Plug 69 contains an outwardly extending cylindrical projection 71. A central bore 73 extends through projection 71 and the main body of the plug 69. At the inner end of bore 73 a central threaded opening 75 is formed along with auxiliary ports 77 in communication with the space formed by the bore 44. The projection 71 is threaded externally and is used to thread into the gas diffuser block in the carbonator with which the feed valve is associated.

Inserted at the outer end of the bore 73 in the projection 71 is a three-piece check valve. The first piece comprises a plastic part 79 in the form of flanged cylinder with a central bore 81. The outer diameter of the flange 80 is equal to the inner diameter of the bore 73. At the top of the cylindrical part 83 above flange 80 a valve seat 85 is formed by an annular projection. A commercially available light weight plastic or rubber valve disc 87 seats on this valve seat 85. It is allowed to move within a chamber 89 which is defined by the top of the cylindrical part 83 and a bore in the third part 91 of this valve. This part is a generally cylindrical piece with a first bore 93 of the same size as the outer diameter of the cylindrical part 83 of the first valve part and an outer diameter equal to the size of bore 73. Bore 93 is continued with a smaller bore 95 through to the outside. At the base of the larger bore 93 are a plurality of ribs 97 which insure that, if the valve disc 87 seats against the inner end of the bore 93, there will still be passages to the bore 95.

Threaded into the bore 75 of the plug member 69 is a further plug 101 with a conical end 103. In a normal position shown, the conical part 103 is spaced from the O-ring 63. The amount of spacing can be adjusted by adjusting the distance which member 101 is threaded into the bore 75.

In operation, gas at 45 psi will act against the piston 45 as indicated by arrows 105. Gas will also flow in the direction of arrow 107 into the bore 51. At this point the pressure inside the carbonator is essentially zero and the difference in pressure will drive the piston 45, against the biasing force of the spring 65, causing the conical portion 103 to seat against the O-ring 63. Flow will now be through the restricted radial passage 55. As described in my aforementioned patent application, the carbonator will include diffusers, and by means of the gas slowly passing through the radial passage 55, then through the opening 77, 81, unseating the disc 87 and out the passage 95 the gas then flows into the diffusers and from the diffusers into the water being carbonated.

After about two minutes, the pressure within the carbonator builds up to about 35 psi. Generally the member 101 shoould be positioned so that, with a 10 psi difference in pressure, gas can flow through the gap between the conical portion 103 and the O-ring 63 and vent out along the same path. If the restricted ports were not present, the carbonator would come up to its full pressure in 15 to 20 seconds. With the valve of FIG. 2, this is delayed to approximately 2 minutes. After these 2 minutes, carbonation is at a reasonably high level. After about 3 to 5 minutes carbonation is at an optimum level. On the other hand with the carbonator described in my aforementioned application, full carbonation took 12 to 15 minutes.

It would be possible to accomplish the same thing as is done with the feed valve or bleed valve with a 0.13 inch orifice into the carbonator. However, if this was done, then when dispensing it would be impossible to replace the gas, which is needed for dispensing, fast enough. With the embodiment of FIG. 2, once the water is carbonated, the piston will be in the position shown, away from the conical surface 103, and, as carbonated water is dispensed, there will be a free flow of gas to replace the volume which is dispensed and to thereby maintain the necessary pressure within the carbonator to continue carrying out dispensing. At this point, a slow feed or slow bleed is no longer needed since the water in the carbonator is already carbonated, i.e., this is a batch carbonator. Only after the carbonated water is used up and the process is repeated with a new supply of fresh water is it necessary to carry out the slow feeding or slow bleeding to quickly and effectively carbonate the new supply of water.

Furthermore, opening up the gas passage after two minutes results in an influx of carbon dioxide at that time which aids in the carbonation of the water.

Figure 3:
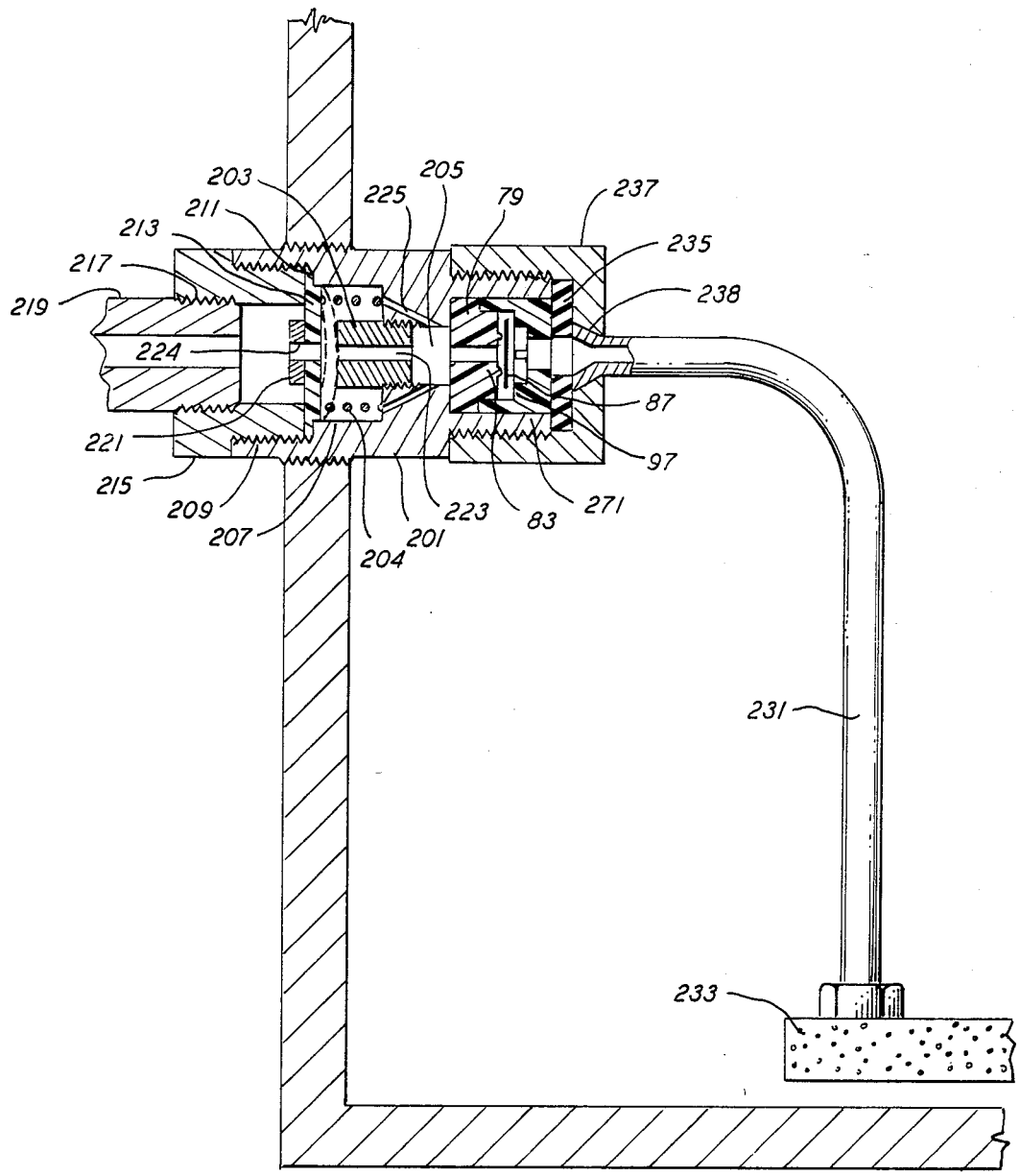
FIG. 3 is an illustration of the further embodiment of slow feed valve according to the present invention.

FIG. 3 illustrates a further embodiment of a carbonator slow feed valve according to the present invention. As illustrated, the valve includes a body part 201. The body part contains a projection 271 corresponding to the projection 71 of FIG. 2. Inserted therein are the same check valve elements as described above in connection with FIG. 2. A member 203 corresponding in general terms to the member 101 is threaded into an internal bore 205 in member 201. Member 201 contains, on the other side of bore 205 bores 207 and 209 of increasingly larger size. Bore 209 is threaded. At the ledge formed between the bores 207 and 209 a diaphragm 213 is inserted. Diaphragm 213 is sealingly held at its edges by a threaded plug 215 which also contains a central threaded bore 217 into which an inlet fitting 219 for inlet of carbon dioxide is sealingly inserted.

Diaphragm 213 has a backing member 221. A hole 224 is formed through member 221 and diaphragm 213 and has a diameter of 0.025 in., for example. Part 203 has a central bore 223 of diameter 0.013 inches, for example. A plurality of passages 225 are formed in the body coupling the space formed by bore 207 to the other side of the member 203 and thus to the inlet of the check valve. In the position shown, flow is through the central opening 224 in the diaphragm and the passages 225 to the check valve and then to a tube 231 leading to a diffuser 233. Tube 231 has a flared end 238 held against a gasket 235 by a nut 237.

When the carbonating process begins, as with the embodiment of FIG. 2, there will be a large pressure differential on the two sides of diaphragm 213. Since the gas cannot get through the small bore 224 to immediately equalize this, the diaphragm 213 will be deflected toward the member 203 and will seal thereagainst. This position is shown in dotted lines. Now, the gas is forced to flow through the narrower passage 223 and the flow will be restricted in the manner described above. When the pressure reaches a differential corresponding to the spring constant of the diaphragm, the diaphragm will move away from the member 203 and the passage shown in FIG. 2 will be reestablished. The position of the member 203 is adjustable so as to adjust the differential pressure at which the diaphragm will separate from member 203. Alternatively, a spring 204 may be used to assist the diaphragm movement away from the seat.

What is claimed is:

1. A method of batch carbonating water and then dispensing in a carbonator using carbon dioxide at a supply pressure, such as to result in fast and efficient carbonating and unrestricted dispensing comprising:

(a) disposing a slow feed valve at the inlet of said carbonator, said slow feed valve having a small orifice and larger orifice;

(b) causing a flow of the carbon dioxide through the water being carbonated at a controlled rate by causing carbon dioxide gas to flow in a controlled manner through said small orifice until a predetermined pressure less than the supply pressure is reached in the carbonator and, upon reaching said predetermined pressure effectively terminating flow through said small orifice; and (c) after said predetermined pressure is reached then allowing gas to flow through said larger orifice.

2. Apparatus for controlling flow of gas in a batch carbonator comprising:

(a) an inlet slow feed valve disposed at the inlet to said carbonator, said inlet slow feed valve containing a small orifice and which will limit flow of gas through water in said carbonator and a valve responsive to the pressure within said carbonator for controlling the flow through said orifice and an orifice of larger size, said valve adapted to maintain said orifice of larger size closed until said predetermined pressure is reached whereupon said valve opens to permit flow through said larger orifice; and (b) a check valve in said slow feed valve to prevent backflow therethrough.

3. Apparatus according to claim 2, in combination with a carbonator vessel and further including at least one gas diffuser in said vessel; and a conduit between said check valve and said diffuser.

4. Apparatus according to claim 2, wherein said feed valve comprises a body member having a first bore at one end thereof for connection to an inlet fitting, a larger bore adjacent thereof forming a cylinder and a further threaded bore adjacent thereto; a piston member in said cylinder, said piston member containing said orifice of larger size and said orifice of smaller size; a valve seat at the outlet of said larger orifice; a plug member screwed into said threaded bore; a biasing spring disposed between said plug member and said piston; a valve member attached to said plug member and adapted to seat against said valve seat when said piston moves toward said plug, said plug having an outlet passage therethrough; and a check valve in said outlet passage, whereby for a large pressure differential, said piston member will be moved against the biasing force of said spring to cause said valve member to seat against said valve seat and said gas will be forced to flow through said smaller orifice and when said pressure builds up within said container, said valve member will move away from said valve seat to permit flow through said larger orifice.

5. Apparatus according to claim 4, and further including means to adjust the position of said plug member.

6. Apparatus according to claim 2, wherein said feed valve comprises a body member having a first threaded bore; a second smaller bore adjacent thereto; a ledge being formed between said first and second bores, and a third, smaller, threaded bore adjacent said second bore; passages formed between said second bore and an outlet; a diaphragm disposed on said ledge, said diaphragm containing said larger orifice; a plug threaded into said third bore, said plug spaced from said diaphragm and forming a seat; an inlet plug screwed into said first bore, holding said diaphragm against said ledge and having an inlet for carbon dioxide; and a check valve in said outlet whereby, initially a pressure differential will seat said diaphragm on said plug seat causing gas to flow through said smaller orifice, but as pressure builds up, said diaphragm will unseat to permit flow through said passages.

7. Apparatus according to claim 6, and further including a spring biasing said diaphragm away from said plug seat.

8. Apparatus for controlling flow of gas in a batch carbonator comprising a bleed valve having a body with a bore therein forming a cylinder threaded at its outer end, an opening into said cylinder at its inner end adapted to be in communication with the inside of a carbonator; a piston member having a bore at its inner end in communication with said opening and an orifice of sufficiently small size so as to limit the flow of gas through water in said carbonator at its outer end, a dished sealing edge at said outer end surrounding said orifice; a disk having on its inner surface a valve seat threaded into the outer end of said cylinder, a spring acting between said disk and said piston biasing said piston sealing edge away from said seat; and at least one port to the atmosphere from said cylinder above said piston, whereby said bleed valve will respond to the pressure within said carbonator for controlling the flow through said orifice.

9. Apparatus according to claim 8, wherein said piston has a marking thereon adapted to align with said port when said sealing edge is seated on said seat.

10. Apparatus according to claim 8, wherein said disk is adjustable.

* * * * *